US008583793B2

(12) United States Patent  
de Icaza

(10) Patent No.: US 8,583,793 B2
(45) Date of Patent: Nov. 12, 2013

(54) SYSTEM AND METHOD FOR PROVIDING A HYPERTEXT TRANSFER PROTOCOL SERVICE MULTIPLEXER

(75) Inventor: Miguel de Icaza, Boston, MA (US)

(73) Assignee: Apple Inc., Cupertino, CA (US)

( * ) Notice: Subject to any disclaimer, the term of this patent is extended or adjusted under 35 U.S.C. 154(b) by 756 days.

(21) Appl. No.: 11/984,488

(22) Filed: Nov. 19, 2007

(65) Prior Publication Data

US 2008/0120412 A1 May 22, 2008

Related U.S. Application Data

(60) Provisional application No. 60/859,927, filed on Nov. 20, 2006.

(51) Int. Cl.
*G06F 15/173* (2006.01)
*H04L 12/66* (2006.01)

(52) U.S. Cl.
USPC .......................................... 709/225; 370/352

(58) Field of Classification Search
USPC ............................................................ 709/227
See application file for complete search history.

(56) References Cited

U.S. PATENT DOCUMENTS

| | | | | |
|---|---|---|---|---|
| 6,012,090 | A * | 1/2000 | Chung et al. | 709/219 |
| 6,490,617 | B1 * | 12/2002 | Hemphill et al. | 709/223 |
| 6,754,621 | B1 * | 6/2004 | Cunningham et al. | 704/219 |
| 6,792,605 | B1 * | 9/2004 | Roberts et al. | 719/313 |
| 6,798,769 | B1 * | 9/2004 | Farmwald | 370/352 |
| 6,842,779 | B1 * | 1/2005 | Nishizawa | 709/220 |
| 6,857,023 | B2 * | 2/2005 | Rivadalla et al. | 709/230 |
| 6,912,582 | B2 * | 6/2005 | Guo et al. | 709/229 |
| 7,080,158 | B1 * | 7/2006 | Squire | 709/245 |
| 7,107,333 | B2 * | 9/2006 | Burbeck et al. | 709/223 |
| 7,640,580 | B1 * | 12/2009 | Plotnikov et al. | 726/12 |
| 7,664,871 | B2 * | 2/2010 | del Val et al. | 709/231 |
| 2001/0047421 | A1 * | 11/2001 | Sridhar et al. | 709/230 |
| 2002/0016820 | A1 * | 2/2002 | Du Val et al. | 709/203 |
| 2002/0083175 | A1 * | 6/2002 | Afek et al. | 709/225 |
| 2002/0107772 | A1 * | 8/2002 | Jain et al. | 705/37 |
| 2002/0107910 | A1 * | 8/2002 | Zhao | 709/203 |
| 2003/0061355 | A1 * | 3/2003 | Yang et al. | 709/227 |

(Continued)

OTHER PUBLICATIONS

Kiuchi, Takahiro, et al., "C-HTTP—The Development of a Secure, closed HTTP-Based Network on the Internet", *Proceedings of the 1996 Symposium on Network and Distributed System Security (SNDSS '96)*, copyright 1996, pp. 64-75.

(Continued)

*Primary Examiner* — Firmin Backer
*Assistant Examiner* — James Edwards
(74) *Attorney, Agent, or Firm* — Park, Vaughan, Fleming & Dowler LLP

(57) ABSTRACT

A system and method for registering one or more services at a location where clients can access the services both locally and remotely is provided. A HyperText Transfer Protocol (HTTP) service multiplexer (HSM) may be accessed at a recognizable location, which may be any suitable location or resource that a client can locate on a local system. The HSM may make a plurality of services available at the recognizable location by binding the location (e.g., a Uniform Resource Identifier (URI)) to URLs or other resources associated with the services. In this manner, the HSM functions similarly to a domain name service, as HTTP redirections can be issued to enable a single well-known resource to be used for accessing the plurality of registered services.

24 Claims, 4 Drawing Sheets

(56) References Cited

U.S. PATENT DOCUMENTS

| | | | |
|---|---|---|---|
| 2003/0191799 A1* | 10/2003 | Araujo et al. | 709/203 |
| 2003/0208563 A1* | 11/2003 | Acree et al. | 709/219 |
| 2003/0217149 A1* | 11/2003 | Crichton et al. | 709/225 |
| 2004/0019630 A1* | 1/2004 | Burbeck et al. | 709/203 |
| 2004/0068532 A1* | 4/2004 | Dewing et al. | 709/200 |
| 2004/0117426 A1* | 6/2004 | Rudkin et al. | 709/200 |
| 2004/0143665 A1* | 7/2004 | Mace et al. | 709/227 |
| 2005/0135418 A1* | 6/2005 | Betts et al. | 370/469 |
| 2005/0229243 A1* | 10/2005 | Svendsen et al. | 726/12 |
| 2006/0026290 A1* | 2/2006 | Pulito et al. | 709/227 |
| 2006/0031374 A1* | 2/2006 | Lu et al. | 709/207 |
| 2006/0041917 A1* | 2/2006 | Vellanki et al. | 725/86 |
| 2006/0136566 A1* | 6/2006 | Ohara et al. | 709/217 |
| 2006/0230124 A1* | 10/2006 | Belfiore et al. | 709/219 |
| 2006/0276196 A1* | 12/2006 | Jiang et al. | 455/446 |
| 2007/0165606 A1* | 7/2007 | Karn et al. | 370/352 |
| 2007/0283441 A1* | 12/2007 | Cole et al. | 726/25 |
| 2007/0294352 A1* | 12/2007 | Shraim et al. | 709/206 |
| 2008/0052384 A1* | 2/2008 | Marl et al. | 709/223 |
| 2009/0259748 A1* | 10/2009 | Mcclure et al. | 709/224 |
| 2009/0313265 A1* | 12/2009 | Sifry | 707/10 |
| 2010/0023582 A1* | 1/2010 | Pedersen et al. | 709/203 |
| 2010/0211776 A1* | 8/2010 | Gunaseelan et al. | 713/165 |

OTHER PUBLICATIONS

Miguel de Icaza's web log, "Soap and Rest", Nov. 26, 2005, printed from the Internet, <htto://tirania.org/blog/archive/2005/Nov-26-2.html>, 3 pages.

Miguel de Icaza's web log, "The Web Desktop", Nov. 27, 2005, printed from the Internet, <http://tirania.org/blog/archive/2005/Nov-27-1.html>, 3 pages.

Lottor, M., "Network Working Group: Request for Comments: 1078", SRI-NIC, TCP Port Service Multiplexer (TCPMUX), Nov. 1988, printed from the Internet, <http://www.networksorcery.com/enp/rfc/rfc1078.txt>, 2 pages.

* cited by examiner

SYSTEM AND METHOD FOR PROVIDING A HYPERTEXT TRANSFER PROTOCOL SERVICE MULTIPLEXER

CROSS-REFERENCE TO RELATED APPLICATIONS

This application claims the benefit of U.S. Provisional Patent Application Ser. No. 60/859,927, entitled "HTTP Service Multiplexor," filed Nov. 20, 2006, the contents of which are hereby incorporated by reference in their entirety.

FIELD OF THE INVENTION

The invention relates to a HyperText Transfer Protocol (HTTP) service multiplexer for using, locating, registering, and activating a plurality of services, and which provides a client with a single entry point for accessing the plurality of services.

BACKGROUND OF THE INVENTION

Historically, communications across applications on a given computer network system have had to use fairly complicated Remote Procedure Call (RPC) systems, which generally limit the usefulness of such systems to those languages, runtimes, and/or libraries configured to utilize RPC libraries or frameworks. In the Windows and UNIX systems, a number of APIs have been developed over the years to enable such communications. One problem has been that these systems have typically been fairly complex and access to those APIs (e.g., COM, CORBA, D-Bus, Gconf) requires manual binding into the libraries or frameworks in the system. These systems suffer from various other drawbacks, some of which are described below.

CORBA uses the Internet Inter-Orb Protocol (IIOP) and usually requires a CORBA stack to be available before it is possible to communicate to various components. Availability of CORBA is spotty at best and the size of the specification is large enough that at least some people tend not to use it, and instead implement their own systems. D-Bus is a system bus for broadcasting messages where service providers can post messages that get distributed to one or more applications listening on a given event. D-Bus requires use of its own home-grown protocol to notify multiple clients on the system. COM is the language of the Windows platform used to communicate to components. It is based on a binary interface and suffers for the drawbacks associated with RPC. Gconf is a system for fetching configuration values from a daemon and be notifying the system of changes in the configuration at runtime. Like D-Bus, Gconf uses an internal protocol (it happens to be implemented on top of CORBA).

All these system suffers from various individual drawbacks but one universal disadvantage to these systems is that they are, among other things, proprietary, heavy weight protocols, and difficult to manage across different languages, frameworks and operating systems. One challenge lies in turning desktop applications into web-aware applications. This requires a mechanism that can locate the applications or services that can be implemented with minimal effort and that can be used across different languages, frameworks and operating systems in order for it to gain traction in the real-world usage.

Existing systems suffer from these and other problems.

SUMMARY OF THE INVENTION

The invention overcoming these and other disadvantages of existing systems generally relates to a system and method for registering one or more services at a location where clients can access the registered services both locally and remotely. The access may include, for example, access to desktop applications over local and/or remote connection. The invention provides access to a HyperText Transfer Protocol (HTTP) service multiplexer (HSM) at a recognizable location (e.g., a Uniform Resource Identifier (URI)), which may be a location that clients know how to locate on a local system. The HSM may make a set of services available at this location by binding the location (URI) to other URLs for services. In this manner the HSM functions similar to a domain name service in that it can issues an HTTP redirection to enable the use of a single well-known URI for access to multiple registered services.

The invention builds on top of the existing HTTP specification, which is widely supported across a wide variety of languages, frameworks, and libraries. The system includes an HTTP Service Multiplexer, one or more services (e.g., application servers), and one or more client applications (e.g., client system). These components can communicate with each other using HTTP. The HSM may include a discovery module, registration module, launching module, and redirection module. The one or more services may be application based services available to the one or more client applications. Individual applications can register their own services with the HSM and expose the services through an HTTP interface. The HSM can process client requests for access to the one or more services.

The HSM may be implemented on a local network location associated with a Uniform Resource Identifier (URI) to multiplex requests to local and remote systems. The URI may be used to access the HSM. The location of the HSM (URI address) may be recorded in a file for client application to look up. For example, the client system may access the HSM as an endpoint using the HSM's URI via a conventional browser. As described above, the HSM includes at least a discovery module, a registration module, a launching module, and a redirection module. Although referred to as modules, these components may also represent computer implemented functions. The discovery module may be used to scan registered services on the system in order to create a list of available services. State and location information may also be recorded for each available service. Services may choose to register with the HSM using the registration module. In addition to registering services, HSM may also launch requested services using the launching module if they are registered but not currently running.

Since the HSM is based on the HTTP protocol, the service may issue an HTTP POST request to the HSM's URI in order to allocate and register a service location (e.g., Universal Resource Locator (URL)). The client application may issue an HTTP GET request to the HSM's URI address in order to access the service location. The HMS may respond to the request by implementing the redirection module in order to redirect the request to the appropriate service registered with the HSM. Clients that are waiting for broadcast can use a GET method on the well-known URI, which is then used by the HSM to keep a connection open. The HSM may use chunked-output to notify clients of updates.

In the HSM, services and client systems both use the same URI location and the HTTP protocol to locate each other. The system may be used as a message bus wherein services can post information for distribution over the message bus using a POST request wherein the HSM posts the information to all the listening clients.

HTTP is a protocol that is almost universally supported. The invention builds services (that are typically available only under a proprietary, specific or very narrow systems) on top of HTTP, making services available to more applications in many more conditions.

The invention provides simplified manner for accessing services. Beyond the HTTP protocol and special URI names, no protocol is mandated or needed. The invention makes it simple for applications and services to interact with each other on a given computer system.

Other objects and advantages of the invention will be apparent to those skilled in the art based on the following drawings and detailed description.

DETAILED DESCRIPTION

The invention is a system and method that among other things, provides access to a local HyperText Transfer Protocol (HTTP) server at a recognizable location (e.g., Uniform Resource Identifier (URI)), the use of HTTP redirection to enable the use of a single known location to act analogously to a dynamic domain name service, and the use of a known URI in the server for binding names to other URLs for service redirection.

Figure 1:
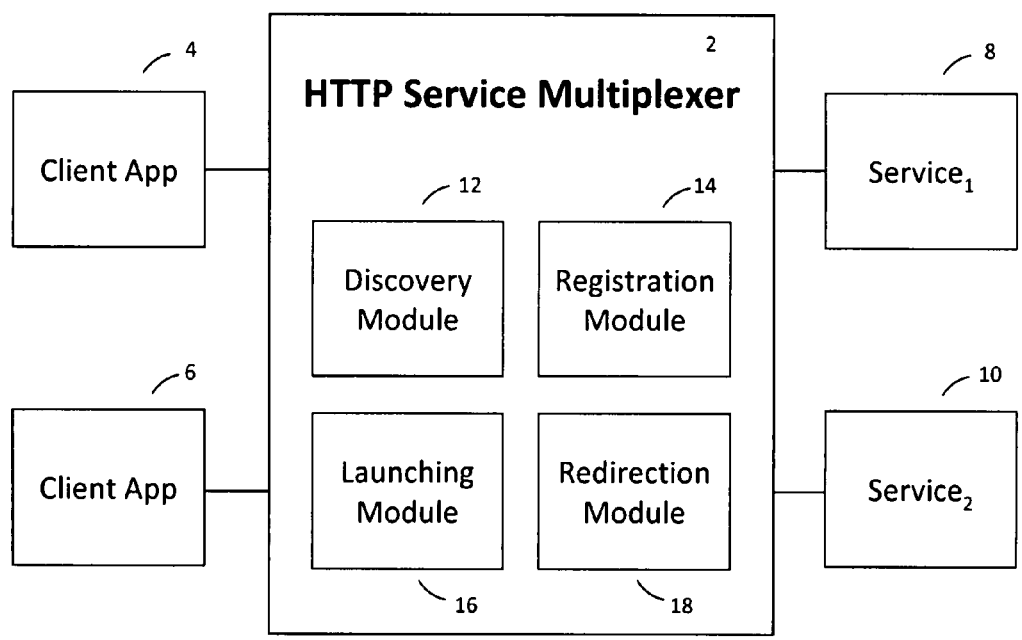
FIG. 1 illustrates a block diagram of an exemplary system for implementing a HyperText Transfer Protocol (HTTP) service multiplexer (HSM) according to various aspects of the invention.

The HTTP server may be referred to as the HTTP service multiplexer (HSM). The HSM may be a standalone process that provides client applications (e.g., client systems) access to services (e.g., application servers) and vice versa. FIG. 1 illustrates a system including the HSM 2, one or more client applications (4, 6), and one or more services (8, 10). The HSM may be implemented on or in association with a server to operate at a network location identified by a URI to multiplex requests to local and remote systems. HTTP may be used to communicate between the client applications, HSM and services. The URI allows the HSM to run at a recognized network location that may be used by the client and services to communicate with each other.

The HSM acts as an activation and arbitration system between client applications (4, 6) and service applications (8, 10). The HSM provides, among other things, a name resolver implemented over HTTP and may be used to locate exposed services. The HSM may include a discovery module 12, registration module 14, launching module 16, and redirection module 18. Each module may function programmatically on a computer system. Discovery module 12 allows the HSM to scan registered services on the system in order to create a list of available services. Registration module 14 allows the services to register with the HSM. If a registered service is requested by a client but not running at the time of the request, then the launching module 16 enables the registered services to be launched. The redirection module 18 allows client application requests to be redirected to a service location. The HSM may also use sockets and text interfaces to communicate.

Figure 2:
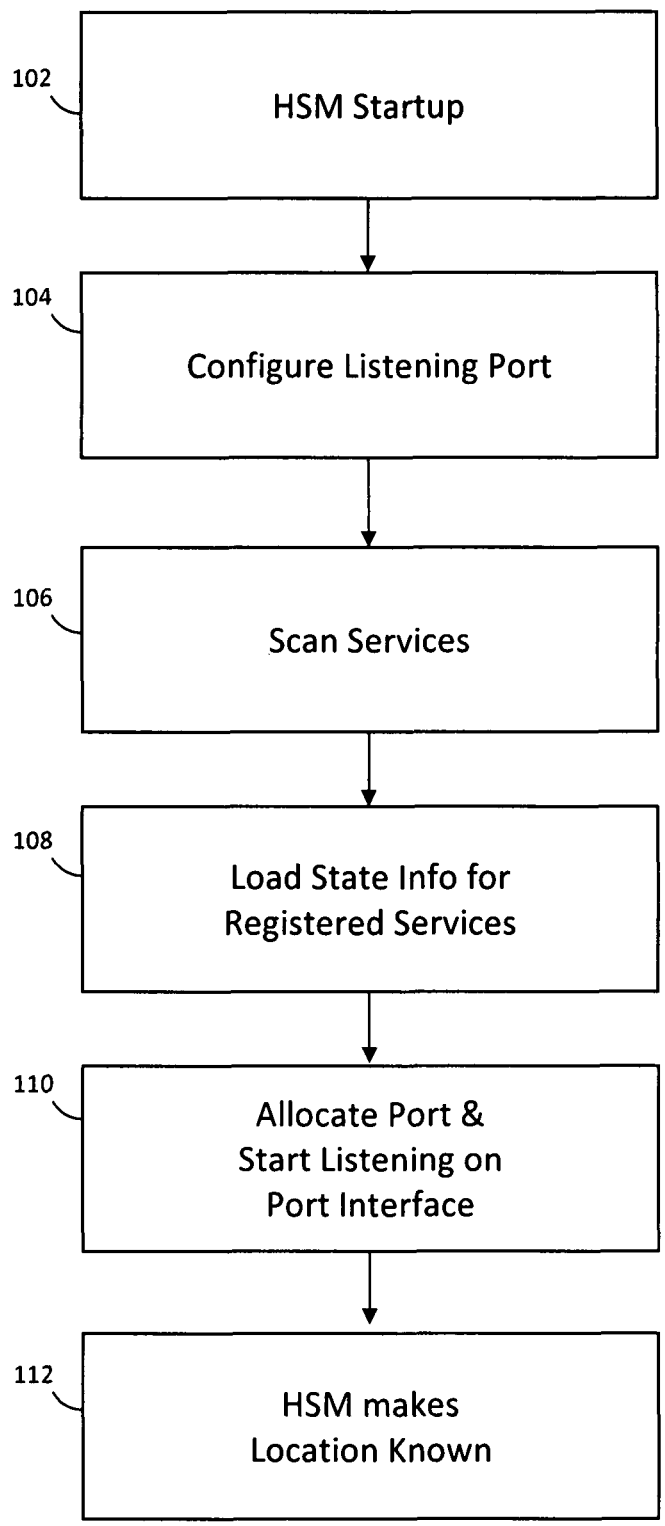
FIG. 2 illustrates a flow diagram of an exemplary method for starting up an HSM according to various aspects of the invention.

FIG. 2 illustrates a flow diagram for beginning an HSM process. In operations, the HSM may be launched at start up (operation 102) and used to determine a port that should be used to communicate/listen on (operation 104). The HSM may scan registered services in order to create its list of available services (operation 106). The state and location information for each service may be recorded by the HSM (operation 108). The process may proceed to allocate the port and use it to listen for communications (operation 110). The HSM location (e.g., URI) is made available by recording the address on an environment or file (operation 112). An example of an address may be http://localhost:1234. This address may be referred to as the URI. The URI may be recorded at a readily recognizable location for users to access. Locations may be file systems environment variables, system level configuration keys, system level data files, system level settings, and/or an operating system designated storage.

Client applications may connect to the HSM by looking up the file or environment variable in order to determine the HSM endpoint (e.g., http://localhost:1234). The URI allows the client to access the HSM using a conventional client system browser. Before discussing the client access to the HSM it is helpful to understand the process used to register services.

Figure 3:
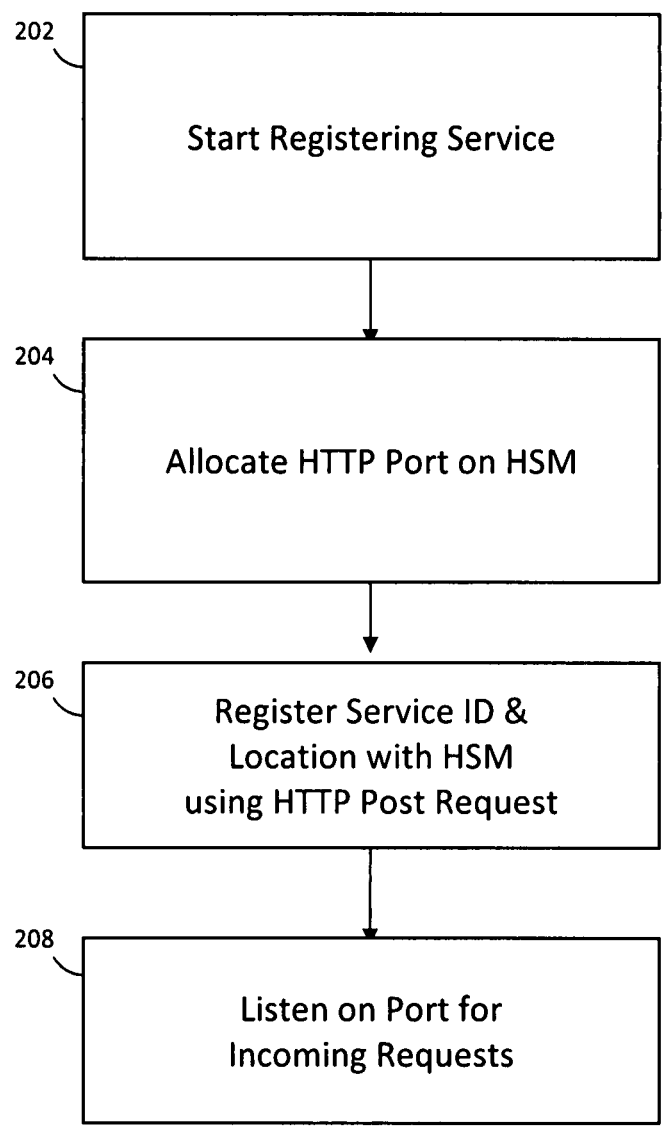
FIG. 3 illustrates a flow diagram of an exemplary method for registering a service according to various aspects of the invention.

FIG. 3 illustrates a flow diagram for registering an application service (or API) on the HSM. The process may begin when a new service or previously unregistered service initiates the registration process (operation 202). The service may allocate a port on the HSM, also referred to as an endpoint (operation 204). The port location may be the endpoint where the HSM exposes the service's API. After a port is identified for the service, it may then be registered with HSM. This may include registering the service identifier (and/or name) and location (e.g., URL) with the HSM using an HTTP POST method (operation 206). The HTTP POST method allows the HSM to register the service identifier (and/or name) with the associated location so that subsequent requests for the service may be redirected to the corresponding service location. Thus, the service is exposed and can listen for incoming requests on the registered port (operation 208).

The method may be described by way of example. In one example, an internet search service may register with the HSM. The search service may allocate an HTTP port (endpoint) on the HSM. Assuming that the port (endpoint) obtained by the search service is port 5645, the service may issue an HTTP POST request that may look like this:

http://localhost:1234/register/service/
SearchService&url=http://localhost:5645/dosearch This allows the service to be registered as "SearchService" with a location of http://localhost:5645/dosearch. It is possible to extend the HSM with other services. For example, a media player application would register an endpoint that would be used to control the media application. The process for communicating with the registered service using the port is described below.

Figure 4:
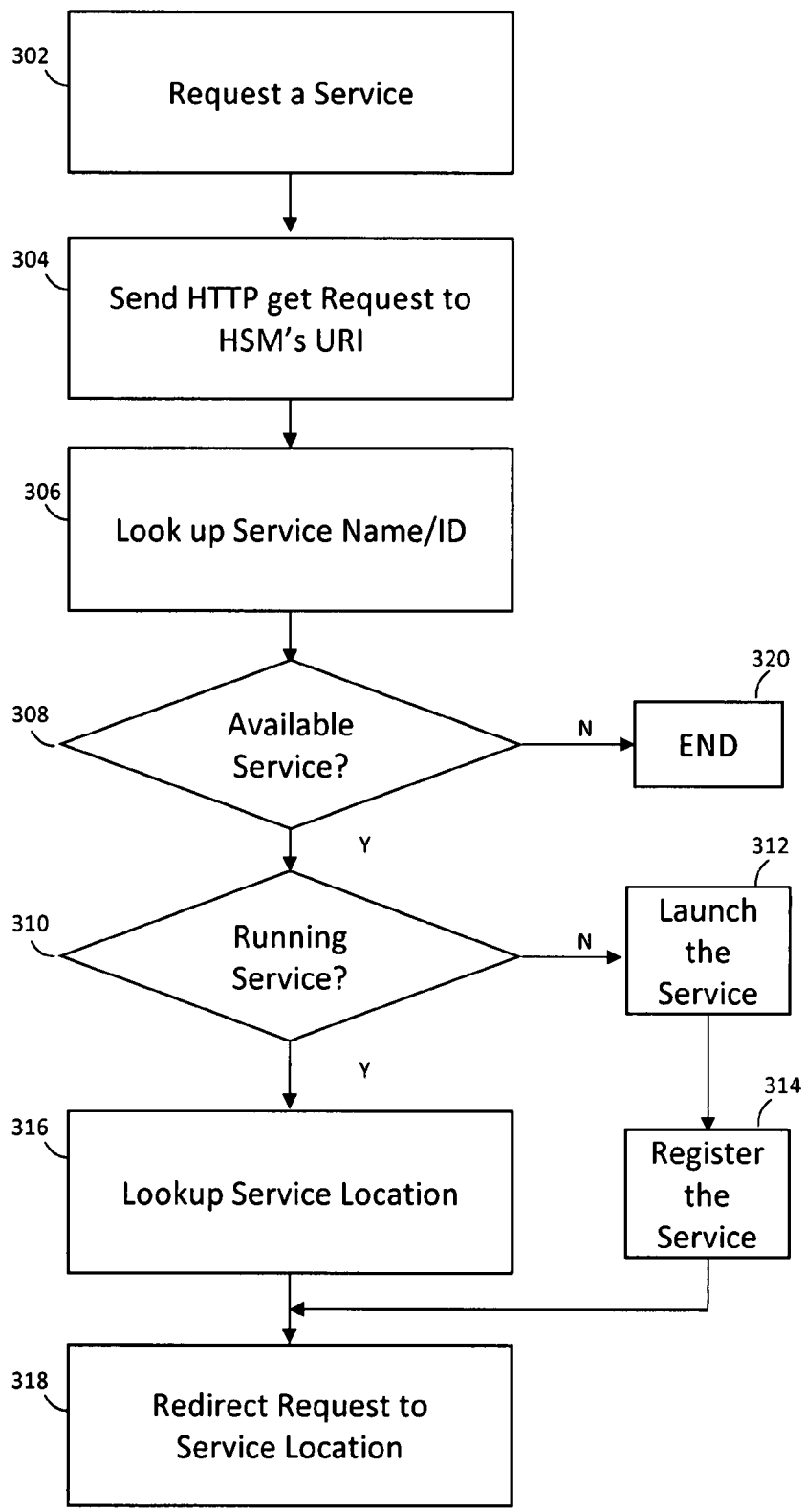
FIG. 4 illustrates a flow diagram of an exemplary method for accessing a service according to various aspects of the invention.

FIG. 4 illustrates a flow diagram for a method used to communicate with a service using the HSM. A local or remote user of a client application may want to access a service (operation 302). In operation 304, the client application may access the service by performing an HTTP GET request on the HSM's known URI (e.g., http://localhost:1234). The request may include the service identifier and/or name and operation. The HSM can look up the identified service to determine whether it is an available service (operation 306 and 308). If the service is not available (e.g., it is not in the list of available services) then the process may end at operation 320. If the service is available then a second determination may be made as to whether the service is currently running (operation 310). If the process is running then the system may lookup the service's registered location (operation 316). The request may be redirected to the service location, where it is handled by the registered service (operation 318). If however, the service is not running at the time of request, the service may be launched using a command (operation 312). The service may proceed to register in the manner discussed above with respect to FIG. 3. After the service is registered the request may be redirected to the registered service location (operation 318).

By way of example, the client may want to perform a search using "SearchService" for the expression "boats". The following HTTP GET request may be used:

http://localhost:1234/global/SearchService/boats

For a request such as this to proceed, the SearchService should be registered with the HSM. The service is either running at this point (and it has thus registered its HTTP endpoint with the HSM) or it is not running (not registered). If the service is not running, the HSM will activate it on demand based on an internal configuration that associates service names with programs. For example, in an attempt to fulfill the request for the SearchService the HSM can launch the application associated with this service and wait for it to register its endpoint with the HSM.

Once the application associated with the service is launched, it can bind to a local TCP/IP port on the HSM and start its own HTTP server. This endpoint can be registered. For the sake of providing an example, we can assume that the port obtained from the operating system is "5645" and that the "SearchService" program uses the /dosearch prefix. Given this example, the SearchService may issue a service registration request in the HSM and register the following URL as its endpoint:

http://local host:5645/dosearch

If the registration is successful, the HSM can continue to process the initial SearchService request. In doing so the HSM may reply to the client with an HTTP redirect response followed by the new URL. In the given example this would be:

http://localhost:5645/dosearch/boats

The HSM may further facilitate message broadcasting from one or more services to one or more client applications. A message bus may be implemented to allow clients and services to share the same messaging infrastructure to allow communication through a shared set of interfaces. Services may notify one or more interested parties (client applications) of data updates. The server applications associated with the service may issue a POST command to the HSM's URI to make the data available to the clients. By way of example, the service may post the state of presence of an instant messaging (IM) conversation by continuously (at random or predetermined time intervals) post the state to the HSM location. This may be done by issuing an HTTP POST with the data to be sent to the various clients using:

http://localhost:1234/bus/im-presence/

The contents of the POST are then broadcast to clients actively listening on a URL associated with the "IM-Presence" space.

Applications interested in listening to bus messages (e.g., configuration changes, bus broadcast messages) can do so by issuing an HTTP GET request on the known URI for the HSM. Unlike regular information delivery where the HTTP connection is closed, the service and HSM uses chunked-encoding to ensure that the connection remains open and the client receives the information in chunks. By way of example, a client may be interested in IM-presence information and may issue an HTTP GET request to the known URI.

http://localhost:1234/bus/im-presence

This is the same location used by the supplier of the data. The difference is that this is a GET request as opposed to a POST request. The HTTP connection here may be HTTP 1.1 (which supports chunked transfers), the connection is set to chunk encoding and the results are delivered as they arrive from the server. Multiple clients may be connected to this same bus, so the information may to be repeated for multiple clients.

A slight variation to receiving bus messages may be to listen for aggregate messages. In this embodiment the client may listen for more than one type of bus message from various sources (services). The service application server may continue to POST data in the same manner as described above. The client however, may issue a GET message that lists more than one type of bus message. The following may be used by the client to issue a GET method to register for changes in more than one location:

http://Localhost:1234/multiple/bus/im-presence&battery-status

In this implementation the chunked output may contain an identifier listing the source of the information. The identifier may be used to tell the different messages relating to IM presence and battery status apart. The identifier may be followed by the actual data.

In another embodiment, the HSM may offer web-front ends to services. This may include producing HTML output for listing, activating, and accessing services from the system. In a further embodiment, end points on the HSM may be used for desktop applications which can enable a user to access applications from a remote location using a standard web browser. The HSM also enables a system and method for remotely manipulating desktop application through HTTP. This mechanism may also allow participants of the local network to access shared information (documents, images, audio) using their web browsers.

In one example, a user may choose to share a file of pictures by running an HTTP server or hosting an ASP.NET page. In either case, the information may be registered with the HSM. A remote user may access the shared pictures by merely directing their browser to the HSM location and requesting a front end application. The request may look like:

http://localhost:1234/application/frontend

From this the HSM may issue a redirect in order to route the message to the correct port.

Another embodiment of the invention provides security. Security on this system requires the use of a shared "secret" between a client and the server. The credentials in the shared secret are passed on the HTTP request as part of the authentication credentials, or alternatively they can be passed as part of the base URI to allow the user to cut-and-paste a URL for use in regular HTTP tools. For example, a "ping" operation on the server could be encoded as the HTTP GET request with the authentication credentials for this URL:

http://localhost:1234/ping

Or with the credentials embedded into the URL:

http://localhost:1234/auth-29asdf828fs48f2g9g482139dkdf/ping

This allows, for example, programmatic access from the command line, or a web browser, without having to provide the keys on the HTTP request.

Implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A data processing system for providing a HyperText Transfer Protocol (HTTP) service multiplexing, comprising:
   one or more applications executed by a processor within the data processing system; and
   an HTTP service multiplexer executed by the processor within the data processing system, configured to:
      allocate a port to a network service locally on the HTTP service multiplexer, wherein the network service binds to the port locally allocated on the HTTP service multiplexer to obtain a local endpoint on the HTTP service multiplexer, the network service associated with a name and a uniform resource locator (URL);
      register the name and the URL for the network service in response to receiving an HTTP POST request from the network service, wherein the HTTP POST request was sent by the network service to a predetermined URL representing the HTTP service multiplexer;
      receive an HTTP GET request from one of the one or more applications, wherein the HTTP GET request further includes the name for the network service; and
      redirect the HTTP GET request received from the application to the port locally allocated to the network service on the HTTP service multiplexer, wherein the network service listens for and receives the HTTP GET request on the port locally allocated to the network service on the HTTP service multiplexer, wherein the one or more applications and the HTTP service multiplexer are running within the data processing system and communicating with each other using the HTTP GET and POST requests over a message bus.

2. The system of claim 1, wherein the HTTP service multiplexer are further configured to launch the network service in response to receiving the HTTP GET request that includes the name for the network service and determining that the network service is not currently running.

3. The system of claim 2, wherein the HTTP service multiplexer redirects the HTTP GET request received from the application to the port locally allocated to the network service in response to launching the network service.

4. The system of claim 1, wherein the HTTP multiplexer is further configured to:
   receive one or more broadcast messages from the network service, wherein the one or more broadcast messages include one or more HTTP POST requests communicated from the network service; and
   deliver the one or more broadcast messages to the application in response to determining that the application has issued one or more HTTP GET requests to the message bus that include the name for the network service, wherein the one or more broadcast messages are delivered as part of a response to the one or more HTTP GET requests pending on the message bus.

5. The system of claim 4, wherein the network service and the message bus communicate the one or more broadcast messages using chunked transfer encoding to maintain an open connection between the network service and the application.

6. The system of claim 4, wherein the HTTP service multiplexer is further configured to:
   receive one or more additional broadcast messages in one or more additional HTTP POST requests communicated from another network service; and
   deliver the one or more additional broadcast messages to the application executing on the client device in response to determining that the one or more HTTP GET requests issued from the application executing on the client device further include a registered name for the other network service.

7. The system of claim 6, wherein the one or more broadcast messages delivered from the message bus to the application executing on the client device include the name for the network service and the one or more additional broadcast messages delivered from the message bus to the application executing on the client device include the registered name for the other network service, thereby distinguishing the one or more broadcast messages from the one or more additional broadcast messages.

8. The system of claim 1, wherein the port locally allocated to the network service on the HTTP service multiplexer represents the local endpoint where the HTTP service multiplexer exposes an application program interface for the network service.

9. The system of claim 1, wherein the one or more processors in the HTTP service multiplexer are further configured to secure the application executing on the client device in response to receiving a URL string from the application executing on the client device that embeds authentication credentials in a secret shared between the HTTP service multiplexer and the client device.

10. The system of claim 1, wherein the one or more processors in the HTTP service multiplexer are further configured to secure the application executing on the client device in response to receiving a ping message from the application executing on the client device that includes authentication credentials in a secret shared between the HTTP service multiplexer and the client device.

11. The system of claim 1, further comprising:
a second network service having a second name and a second URL,
wherein the second network service is directed towards a different application executing on the client device than the network service.

12. The system of claim 11, wherein the HTTP service multiplexer is further configured to:
allocate a second port to the second network service locally on the HTTP service multiplexer, wherein the second network service binds to the second port locally allocated on the HTTP service multiplexer to obtain a local endpoint on the HTTP service multiplexer;
register the second name and the second URL for the second network service in response to receiving an HTTP POST request from the second network service;
receive a message that includes an HTTP GET request from an application executing on a client device, wherein the message that includes the HTTP GET request further includes the second name for the second network service; and
redirect the message received from the application executing on the client device to the second port locally allocated to the second network service on the HTTP service multiplexer, wherein the second network service listens for and received the message that includes the HTTP GET request on the second port locally allocated to the second network service on the HTTP service multiplexer.

13. A computer implemented method for providing a HyperText Transfer Protocol (HTTP) service multiplexing, the method comprising:
registering a network service with the HTTP service multiplexer executed by a processor within a data processing system, wherein registering the network service includes:
allocating a port to the network service on the HTTP service multiplexer, wherein the network service binds to the port locally allocated on the HTTP service multiplexer to obtain a local endpoint on the HTTP service multiplexer;
receiving, at the HTTP service multiplexer, an HTTP POST request from the network service that includes a name and a Uniform Resource Locator (URL) for the network service; and
registering the name and the URL for the network service at the HTTP service multiplexer in response to receiving the HTTP POST request from the network service;
receiving, at the HTTP service multiplexer, a message that includes an HTTP GET request from an application executed by the processor within the data processing system, wherein the message that includes the HTTP GET request further includes the name for the network service; and
redirecting the message received from the application to the port locally allocated to the network service on the HTTP service multiplexer, wherein the network service listens for and receives the message that includes the HTTP GET request on the port locally allocated to the network service on the HTTP service multiplexer, wherein the application and the HTTP service multiplexer are running within the data processing system and communicating with each other using HTTP GET and HTTP POST requests.

14. The method of claim 13, further comprising launching the network service in response to the HTTP service multiplexer receiving the message that includes the name for the network service and determining that the requested network service is not currently running.

15. The method of claim 14, wherein the HTTP service multiplexer redirects the message received from the application to the port locally allocated to the network service in response to launching the network service.

16. The method of claim 13, further comprising:
receiving one or more broadcast messages from the network service at a message bus implemented on the HTTP multiplexer, wherein the one or more broadcast messages include one or more HTTP POST requests communicated from the network service; and
delivering the one or more broadcast messages to the application in response to determining that the application has issued one or more HTTP GET requests to the message bus that include the name for the network service.

17. The method of claim 16, wherein the network service and the message bus communicate the one or more broadcast messages using chunked transfer encoding to maintain an open connection between the network service and the application.

18. The method of claim 16, further comprising:
receiving one or more additional broadcast messages from another network service at the message bus implemented on the HTTP multiplexer, wherein the one or more additional broadcast messages include one or more additional HTTP POST requests communicated from the other network service; and
delivering the one or more additional broadcast messages to the application executing on the client device in response to determining that the one or more HTTP GET requests issued from the application executing on the client device further include a registered name for the other network service.

19. The method of claim 18, wherein the one or more broadcast messages delivered from the message bus to the application executing on the client device include the name for the network service and the one or more additional broadcast messages delivered from the message bus to the application executing on the client device include the registered name for the other network service, thereby distinguishing the one or more broadcast messages from the one or more additional broadcast messages.

20. The method of claim 13, wherein the port locally allocated to he network service on the HTTP service multiplexer represents the local endpoint where the HTTP service multiplexer exposes an application program interface for the network service.

21. the method of claim 13, further comprising securing the application executing on the client device in response to receiving a URL string from the application executing on the client device that embeds authentication credentials in a secret shared between the HTTP service multiplexer and the client device.

22. The method of claim 13, further comprising securing the application in response to receiving a ping message from the application executing on the client device that includes authentication credentials in a secret shared between the HTTP service multiplexer and the client device.

23. A non-transitory machine-readable medium having instructions stored therein, which when executed by a processor, cause the processor to perform a method for providing a HyperText Transfer Protocol (HTTP) service multiplexing, the method comprising:

registering a network service with the HTTP service multiplexer executed by a processor within a data processing system, wherein registering the network service includes:

allocating a port to the network service on the HTTP service multiplexer, wherein the network service binds to the port locally allocated on the HTTP service multiplexer to obtain a local endpoint on the HTTP service multiplexer;

receiving, at the HTTP service multiplexer, an HTTP POST request from the network service that includes a name and a Uniform Resource Locator (URL) for the network service; and registering the name and the URL for the network service at the HTTP service multiplexer in response to receiving the HTTP POST request from the network service;

receiving, at the HTTP service multiplexer, a message that includes an HTTP GET request from an application executed by the processor within the data processing system, wherein the message that includes the HTTP GET request further includes the name for the network service; and redirecting the message received from the application to the port locally allocated to the network service on the HTTP service multiplexer, wherein the network service listens for and receives the message that includes the HTTP GET request on the port locally allocated to the network service on the HTTP service multiplexer, wherein the application and the HTTP service multiplexer are running within the data processing system and communicating with each other using HTTP GET and HTTP POST requests.

24. The medium of claim 23, wherein the method further comprises launching the network service in response to the HTTP service multiplexer receiving the message that includes the name for the network service and determining that the requested network service is not currently running.

* * * * *